United States Patent
Raffone et al.

(10) Patent No.: US 11,897,452 B2
(45) Date of Patent: Feb. 13, 2024

(54) AUTOMOTIVE ELECTRONIC LATERAL DYNAMICS CONTROL SYSTEM FOR A SELF-DRIVING MOTOR VEHICLE

(71) Applicant: C.R.F. SOCIETA' CONSORTILE PER AZIONI, Orbassano (IT)

(72) Inventors: Enrico Raffone, Orbassano (IT); Claudio Rei, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 225 days.

(21) Appl. No.: 17/418,481

(22) PCT Filed: Dec. 27, 2019

(86) PCT No.: PCT/IB2019/061405
§ 371 (c)(1),
(2) Date: Jun. 25, 2021

(87) PCT Pub. No.: WO2020/136619
PCT Pub. Date: Jul. 2, 2020

(65) Prior Publication Data
US 2022/0080954 A1    Mar. 17, 2022

(30) Foreign Application Priority Data
Dec. 27, 2018 (IT) .............. 102018000021244

(51) Int. Cl.
*B60W 30/045* (2012.01)
*B60W 10/18* (2012.01)
(Continued)

(52) U.S. Cl.
CPC .......... *B60W 30/045* (2013.01); *B60W 10/18* (2013.01); *B60W 10/20* (2013.01);
(Continued)

(58) Field of Classification Search
CPC ...... B60W 30/02; B60W 30/10; B60W 30/12; B60W 10/20; B60W 30/045;
(Continued)

(56) References Cited

U.S. PATENT DOCUMENTS 6,487,501 B1 * 11/2002 Jeon ............... B62D 15/025
                                                    702/167
6,704,623 B2 *  3/2004 Gehring ............ B60T 8/1755
                                                    701/1
(Continued)

OTHER PUBLICATIONS

International Search Report and Written Opinion of the ISA issued in PCT/IB2019/061405, dated Apr. 28, 2020; ISA/EP.
(Continued)

*Primary Examiner* — Khoi H Tran
*Assistant Examiner* — Rodney P King
(74) *Attorney, Agent, or Firm* — Harness, Dickey & Pierce, P.L.C.

(57) ABSTRACT

An automotive electronic lateral dynamics control system of an autonomous motor vehicle, comprising a lateral driving path planner designed to plan a lateral driving path of the autonomous motor vehicle and defined by a reference curvature of the autonomous motor vehicle; an automotive electronic driving stability control system designed to control an automotive braking system to apply to the autonomous motor vehicle a yaw torque to hinder a driving instability condition of the autonomous motor vehicle; and an automotive electronic steering control system designed to
(Continued)

control an automotive steering system to apply to the autonomous motor vehicle a steering angle or torque to cause the autonomous motor vehicle to follow the lateral driving path planned by the lateral driving path planner. The automotive electronic lateral dynamics control system is designed to cause an intervention of the automotive electronic steering control system to take account of an intervention of the automotive electronic driving stability control system.

7 Claims, 4 Drawing Sheets

(51) Int. Cl.
*B60W 10/20* (2006.01)
*B60W 30/12* (2020.01)
*B60W 50/00* (2006.01)
*B60W 60/00* (2020.01)

(52) U.S. Cl.
CPC ........ *B60W 30/12* (2013.01); *B60W 50/0098* (2013.01); *B60W 60/001* (2020.02); *B60W 2050/0008* (2013.01); *B60W 2520/06* (2013.01); *B60W 2520/10* (2013.01); *B60W 2520/125* (2013.01); *B60W 2520/14* (2013.01); *B60W 2552/30* (2020.02); *B60W 2710/18* (2013.01); *B60W 2710/202* (2013.01); *B60W 2710/207* (2013.01)

(58) Field of Classification Search
CPC ............. B60W 50/0098; B60W 10/18; B60W 10/184; B62D 6/003; B62D 15/025
See application file for complete search history.

(56) References Cited

U.S. PATENT DOCUMENTS

| | | | | |
|---|---|---|---|---|
| 8,131,415 | B2* | 3/2012 | Peake | G05D 1/0212 |
| | | | | 701/25 |
| 9,944,259 | B2* | 4/2018 | Bunk | B60T 8/17 |
| 10,093,316 | B2* | 10/2018 | Kumai | B60W 30/16 |
| 11,014,553 | B2* | 5/2021 | Ozawa | B60W 20/15 |
| 11,332,128 | B2* | 5/2022 | Sakamoto | B60W 30/0956 |
| 11,644,834 | B2* | 5/2023 | Ditty | G06V 20/58 |
| | | | | 701/23 |
| 2005/0216161 | A1* | 9/2005 | Sakugawa | B60T 8/1755 |
| | | | | 701/1 |
| 2005/0246101 | A1 | 11/2005 | Courtenay et al. | |
| 2006/0100766 | A1 | 5/2006 | Schwarz et al. | |
| 2010/0228420 | A1 | 9/2010 | Lee | |
| 2011/0098886 | A1 | 4/2011 | Deng | |

OTHER PUBLICATIONS

International Preliminary Report on Patentability issued in PCT/IB2019/061405, dated Apr. 8, 2021.

* cited by examiner

AUTOMOTIVE ELECTRONIC LATERAL DYNAMICS CONTROL SYSTEM FOR A SELF-DRIVING MOTOR VEHICLE

CROSS-REFERENCE TO RELATED APPLICATIONS

This patent application is a U.S. National Phase Application under 35 U.S.C. 371 of International Application No. PCT/IB2019/061405, filed on Dec. 27, 2019, which claims priority to Italian patent application no. 102018000021244 filed on Dec. 27, 2018. The entire disclosures of the above-identified applications are incorporated herein by reference.

TECHNICAL FIELD OF THE INVENTION

The present invention relates in general to an automotive electronic active safety system for an autonomous motor vehicle, and, in particular, to an automotive electronic lateral dynamics control system for an autonomous motor vehicle.

The present invention finds application in any type of road motor vehicle, whether it is used to transport people, such as a car, a bus, a camper van, etc., or to transport goods, such as an industrial vehicle or a light or medium-heavy commercial vehicle (a van, covered body vehicle, cabin cruiser, etc.).

STATE OF THE ART

As is known, in recent years car manufacturers have invested considerable resources in researching automotive Advanced Driver Assistance Systems (ADAS) to improve driving safety and comfort. For this reason and due to the fact that they will help achieve the goals set by the European Union for reducing road accidents, ADAS are one of the fastest growing segments in the automotive sector and bound to become increasingly popular in the years to come.

ADAS safety features are designed to avoid collisions and accidents by offering technologies that warn drivers of potential problems, or to avoid collisions by implementing safeguard measures and taking control of the motor vehicles. Adaptive features can automate lighting, provide adaptive cruise control, automate braking, incorporate GPS/traffic signalling, connect smartphones, alert drivers of other motor vehicles to hazards, keep drivers in the right lane, or show what is in blind spots.

ADAS technology is based on vision/camera systems, sensory systems, automotive data networks, vehicle-to-vehicle (V2V) or vehicle-to-infrastructure (V2I) communication systems. Next-generation ADAS systems will increasingly take advantage of wireless connectivity to offer added value to V2V or V2I communication.

According to studies conducted by Accident Research of the German Association of Insurers (GDV), in fact, lane departure warning systems alone are able to prevent up to 15% of road accidents, while assistance at intersections can avoid up to 35% of road accidents.

Technological developments such as radar and camera integration, and data fusion of sensory data from multiple applications are expected to bring about a change in motor vehicles that will be more substantial over the next two decades than it has been in the 130 years that have elapsed since the first motor vehicle was produced.

The end-point of these technological developments is usually defined as self-driving, driverless or autonomous motor vehicles. The terms are overwhelmingly most often used interchangeably, as in the present discussion, whereas in some specialized environments these terms are, instead, used differently to make subtle distinctions.

In particular, the term autonomous motor vehicles was used to indicate those motor vehicles that resemble today's motor vehicles, i.e., with the seats facing forward and a steering wheel, and wherein the driver is deprived of driving tasks only in certain circumstances, for example for self-parking or self-braking or for Adaptive Cruise Control to adjust the speed so as to maintain a safe distance from vehicles ahead. In the near future, autonomous motor vehicles could take total control of the driving in heavy traffic or on motorways.

The term self-driving or driverless motor vehicles has instead been used to indicate those motor vehicles that are considered to represent a step forward compared to autonomous motor vehicles i.e., motor vehicles in which the steering wheel will completely disappear, and which will make the whole trip by using the same sensory system used by autonomous motor vehicles.

Disregarding this subtle distinction, the true distinction is between assisted driving motor vehicles, where the motor vehicle "assists" the driver (who is therefore not exempt from paying attention), by braking if the motor vehicle in front brakes, slowing down when required, and so on, and automatic or automated driving motor vehicles, where the motor vehicle, unlike the previous one, drives fully autonomously and the driver does not need to pay attention.

An example of this terminological distinction is given by the article by Wood et al, (2012), in which the author writes: "This article generally uses the term autonomous instead of the term automated. The term "autonomous" was chosen "because it is the term that is currently in more widespread use (and thus is more familiar to the general public). However, the term "automated" is arguably more accurate as it connotes control or operation by a machine, while "autonomous" connotes acting alone or independently. Currently, most vehicles (which do not know they have a person in the seat), use communication with the Cloud, or with other vehicles, and do not independently enter the destination. This is why the term "automated" would be better to describe this vehicle concept".

In 2014, the SAE (Society of Automotive Engineers) International, a standardization body in the aerospace, automotive, and vehicle industry that works on developing and defining engineering standards for motorized vehicles of all kinds, including cars, trucks, ships, and aircraft, published a new International Standard J3016, which defined six different levels for automatic driving. This classification is based on how much the driver has to intervene with the motor vehicle, rather than on the motor vehicle's capabilities.

The six levels of automatic driving are:
Level 0—No autonomy: the driver must take care of all driving aspects, with no electronic support;
Level 1—Driver assistance: the driver must take care of all driving aspects, but is supported with information (in the form of visual or acoustic alerts) by electronic systems that can signal the presence of dangerous situations or adverse conditions. At this level, the car merely analyses and represents the situations; thus, the driver has total and full responsibility for driving the vehicle;
Level 2—Partial automation: the driver takes care of the driving, but there is a first driving integration. At this level, the motor vehicle intervenes in acceleration and braking through safety systems, such as for example brake assist and anti-collision emergency braking. The direction and traffic control are still under the control of the driver, although in certain scenarios with clearly visible road markings, the steering can be managed in a partially automated way (systems called Lane Keeping Assist, and in the most complete versions Traffic Jam Assist, Autosteer, Highway Assist, depending on the car brand);

Level 3—Conditional automation: the motor vehicle is able to manage the driving in ordinary environmental conditions, managing acceleration, braking and direction, while the driver intervenes in problematic situations in the event of a system request or if the driver himself/herself verifies adverse conditions;

Level 4—High automation: the self-driving system is able to manage any eventuality, but must not be activated in extreme driving conditions as in the case of bad weather;

Level 5—Complete automation: the self-driving system is able to manage all situations that can be managed by humans, without any human intervention.

In the context of the classification of these new technologies, the United Nations Economic Commission for Europe (UN/ECE) has also taken action with Regulation no. 79 dE/ECE/324/Rev.1/Add.78/Rev.3-E/ECE/TRANS/505/Rev.1/Add.78/Rev.3 entitled *Agreement Concerning the Adoption of Harmonized Technical United Nations Regulations for Wheeled Vehicles, Equipment and Parts which can be Fitted and/or be Used on Wheeled Vehicles and the Conditions for Reciprocal Recognition of Approvals Granted on the Basis of these United Nations Regulations*", whose Addendum no. 78 of 30 Nov. 2017 sets forth, using a nomenclature different from that used by the SAE, uniform provisions regarding the configuration and operation of steering systems for road vehicles.

Until now, in fact, the main requirement for steering systems has been the presence of a positive mechanical connection between the steering control, usually consisting of a steering wheel, and the wheels, to determine the vehicle's path. A large mechanical connection was considered not subject to breakdown.

Technological advances, the desire to improve occupant safety through the elimination of the mechanical steering column, and the productive advantages associated with an easier transfer of steering control between left-hand drive and right-hand drive vehicles have led to a review of the traditional approach. Consequently, the Regulation has been amended to take new technologies into account and, from now on, it will be possible to have steering systems in which there is no mechanical connection between the steering control and the wheels of the motor vehicle.

Systems in which the driver retains primary control of the motor vehicle but can be assisted by signals generated on board the motor vehicle that affect the steering system are referred to as "Advanced Driver Assistance Steering Systems".

Such systems may incorporate, for example, an "Automatically Commanded Steering Function" that uses passive infrastructure elements to help the driver keep the motor vehicle on its ideal path (Lane Guidance, Lane Keeping, Heading Control), perform low speed manoeuvres in confined spaces, or stop the motor vehicle at a predefined point (Bus Stop Guidance).

Advanced Driver Assistance Steering Systems can also comprise a "Corrective Steering Function" that, for example, warns the driver when the vehicle leaves the lane ("Lane Departure Warning"), corrects the steering angle to prevent the vehicle from leaving the lane ("Lane Departure Avoidance"), or corrects the steering angle of one or more wheels to improve the dynamic behaviour or stability of the motor vehicle.

With any Advanced Driver Assistance Steering Systems, the driver can decide at any time to deliberately dismiss the assistance function, for example to avoid obstacles on the roadway.

This technology also makes it possible to affect or control the steering, the engine, and the braking system by means of sensors and signals generated on board the motor vehicle or by elements external to it, for example signals transmitted by transponders placed along the road or active elements inserted in the road surface. These systems, which do not require the presence of the driver on board the motor vehicle, have been referred to as "Autonomous Steering Systems".

US 2005/216161 A1 discloses a running stability control device for a vehicle capable of controlling a steering angle of steered vehicle wheels independently of a steering operation by a driver, and a driving/braking force applied to each vehicle wheel. The running stability control device computes a target turn running control quantity of the vehicle, and shares the target turn running control quantity into a first part for the steering angle control and a second part for the driving/braking force control according to a sharing ratio, wherein the sharing ratio is variably changed according to a running condition of the vehicle relative to a road.

US 2010/228420 A1 discloses a model-based predictive control for providing steering control for automated lane centring and lane changing control systems in an autonomous or semi-autonomous vehicle system. A vehicle vision system calculates roadway lane marking information, such as lateral offset, yaw angle and roadway curvature with respect to the vehicle's centred coordinate system. The roadway is then modelled as a second order polynomial equation. The roadway lateral position and yaw angle are then predicted over a pre-defined lane change completion time using a vehicle dynamic model. The predicted vehicle path is then compared with a desired vehicle path to generate an error value, and a steering angle command is calculated to minimize the error value as a function of vehicle lateral position, vehicle lateral speed, vehicle yaw rate and vehicle yaw angle. The steering angle command is then sent to the vehicle steering system.

US 2005/246101 A1 discloses an automotive stability control system for road vehicles comprising a limit management assistance controller that uses video detection lane measurements in combination with vehicle dynamics information. These comprise inertial brakes and steering measurements to control EPS and VSC automotive systems to assist the driver in stabilising the motor vehicle and correcting any lane departure before and/or during understeering, oversteering, asymmetric or split mu friction, and heavy braking conditions and lane changes.

US 2006/100766 A1 discloses a method for increasing the driving stability of a motor vehicle during braking, where compensating steering angles for an adjusted and/or controlled steering system are computed based on different input parameters, so that the motor vehicle driving stability is increased by steering interventions. During steering interventions, at least two interference compensation portions for compensation steering angles are taken into account in order to achieve a more comfortable control; one of the interference compensation portions is computed based on the motor vehicle's path.

US 2011/098886 A1 discloses a motor vehicle control architecture designed based on a top-down approach with abstraction and modularity. The control architecture comprises a vehicle/environment detection and perception processor that processes signals from sensors and motion planning processors that provide lane centre path planning and tracking, lane change path planning and tracking, and target and forward and return speed controls. The architecture also comprises a driver control interpreter that interprets the driver's controls and a control integration processor that provides reference dynamics for the lateral, roll, and longitudinal dynamics of the vehicle. The architecture also comprises a supervisory and control integration controller that provides control integration and generates integrated longitudinal force control signals, integrated lateral force control signals, integrated yaw moment control signals, and steering torque control signals used by longitudinal motor vehicle controllers and a lateral motor vehicle controller.

Subject and Summary of the Invention

The purpose of this invention is to provide an automotive electronic lateral dynamics control system of an autonomous self-driving motor vehicle.

According to the present invention, an automotive electronic lateral dynamics control system of an autonomous self-driving motor vehicle is provided, as claimed in the appended Claims.

DETAILED DESCRIPTION OF PREFERRED EMBODIMENTS OF THE INVENTION

The present invention will now be described in detail with reference to the attached figures so as to allow a person skilled in the art to create and use it. Various modifications to the described embodiments will be readily apparent to the persons skilled in the art and the general principles described herein may be applied to other embodiments and applications without departing from the protective scope of the present invention as defined in the attached claims. Therefore, the present invention should not be regarded as limited to the embodiments described and shown; it should, instead, be granted the widest protective scope consistent with the features described and claimed.

In a nutshell, the present invention essentially provides for coordinating the operation of the automotive electronic steering control system, hereinafter referred to as EPS (Electric Power Steering) system for the sake of brevity, with the operation of the automotive electronic driving stability control system, hereinafter referred to as ESC (Electronic Stability Control) system for the sake of brevity, so that the ESC and EPS systems synergistically co-operate to create an integrated automotive electronic control system for controlling the lateral dynamics of an autonomous motor vehicle, and in which the intervention of the EPS system takes account of the intervention of the ESC system on the motor vehicle.

As is well known, in fact, an ESC system for a manually-driven motor vehicle is designed to detect the occurrence of a motor vehicle driving instability condition and, when detected, to compute a yaw torque $T_{yaw_{ref}}$ that is to be applied to the motor vehicle in order to hinder the motor vehicle's driving instability, and to control accordingly the automotive braking system to cause the yaw torque $T_{yaw_{ref}}$ to be applied to the motor vehicle to hinder the motor vehicle's driving instability.

An EPS system of an autonomous or manually-driven motor vehicle is designed to receive a steering command for the automotive steering system in the form of either a steering angle $\delta_{sw_{ref}}$ that the wheels or the steering column of the motor vehicle have to follow, or a steering torque $T_{sw_{ref}}$ that is to be applied to the steering column of the motor vehicle to cause the motor vehicle to follow a planned lateral driving path, and to control accordingly the automotive steering system based on the steering command to cause either the steering angle $\delta_{sw_{ref}}$ or torque $tT_{sw_{ref}}$ to be applied to the wheels or the steering column of the motor vehicle so as to result in the motor vehicle driving the planned lateral driving path.

Figure 1:
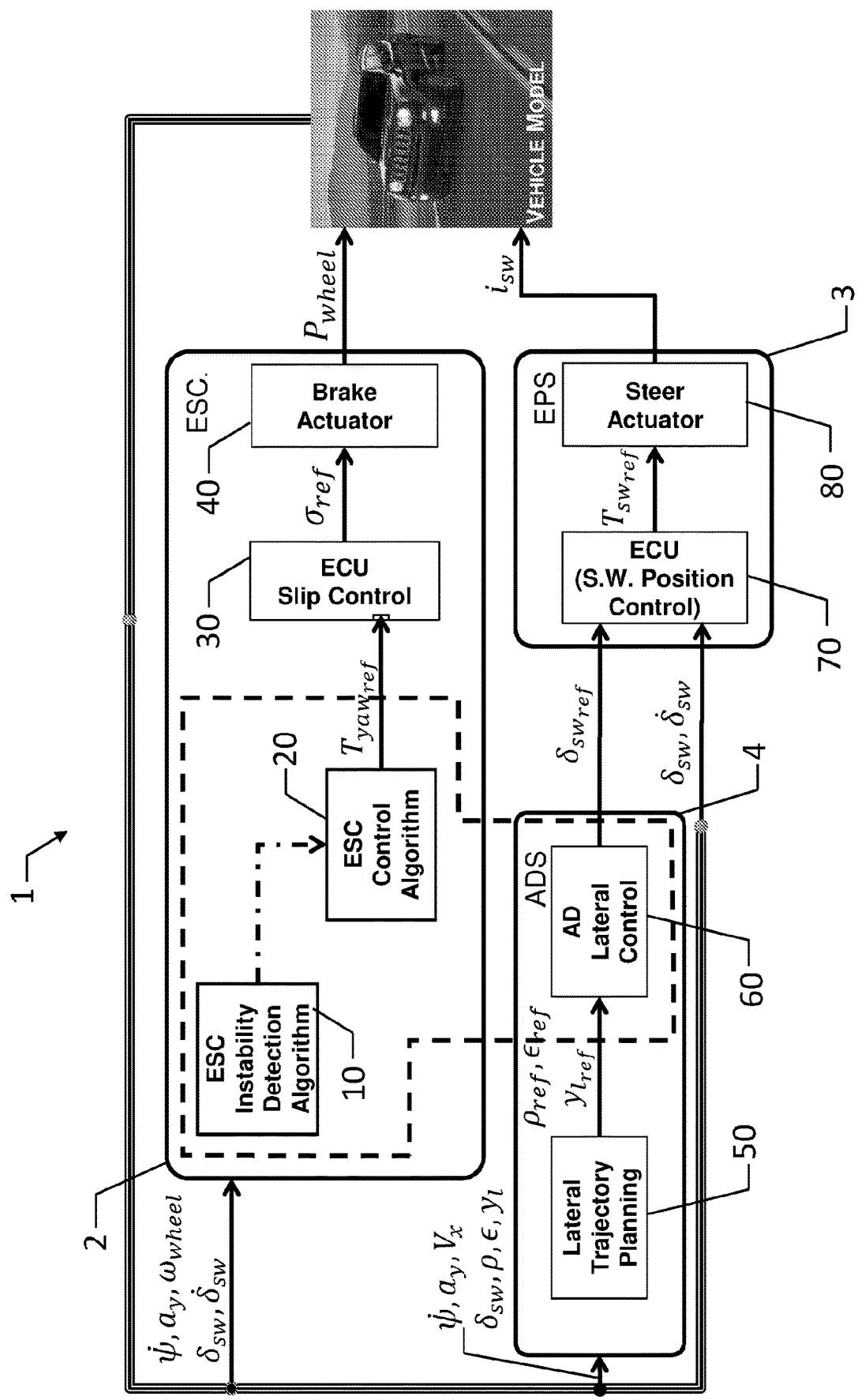
FIG. 1 shows a block diagram of a high-level architecture of an automotive advanced electronic system for controlling driving stability of an autonomous self-driving motor vehicle, according to a first embodiment of the present invention.
Figure 2:
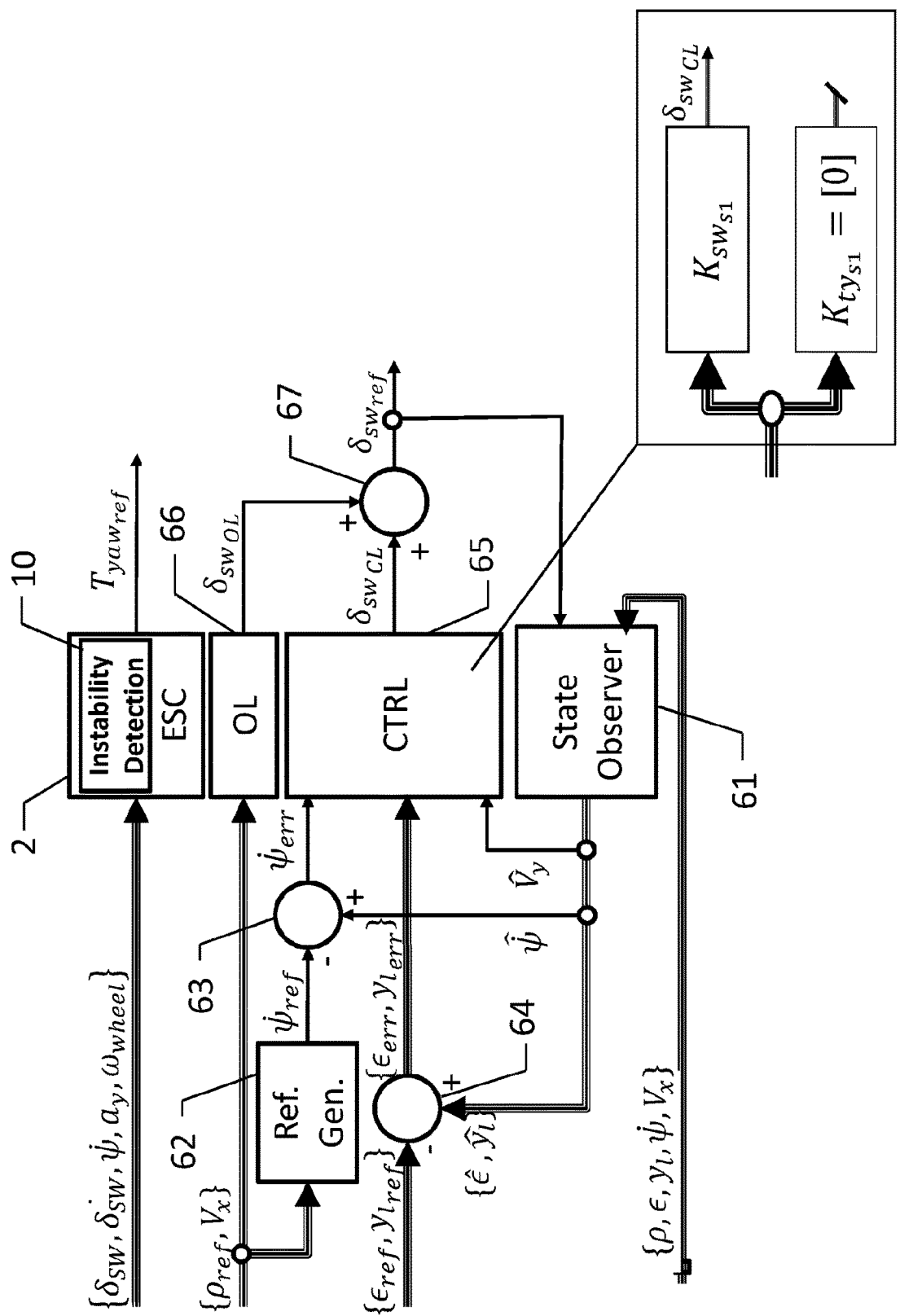
FIG. 2 shows a detailed block diagram of the automotive advanced electronic control system shown in FIG. 1.

In a first embodiment shown in FIGS. 1 and 2, the interventions of the ESC and EPS systems are coordinated without making changes to the logical architecture of the ESC system, but acting only on the logical architecture of the EPS system, so as to cause the intervention of the EPS system to take into account the intervention of the ESC system, thus basically representing an incremental improvement of the ESC system.

Figure 3:
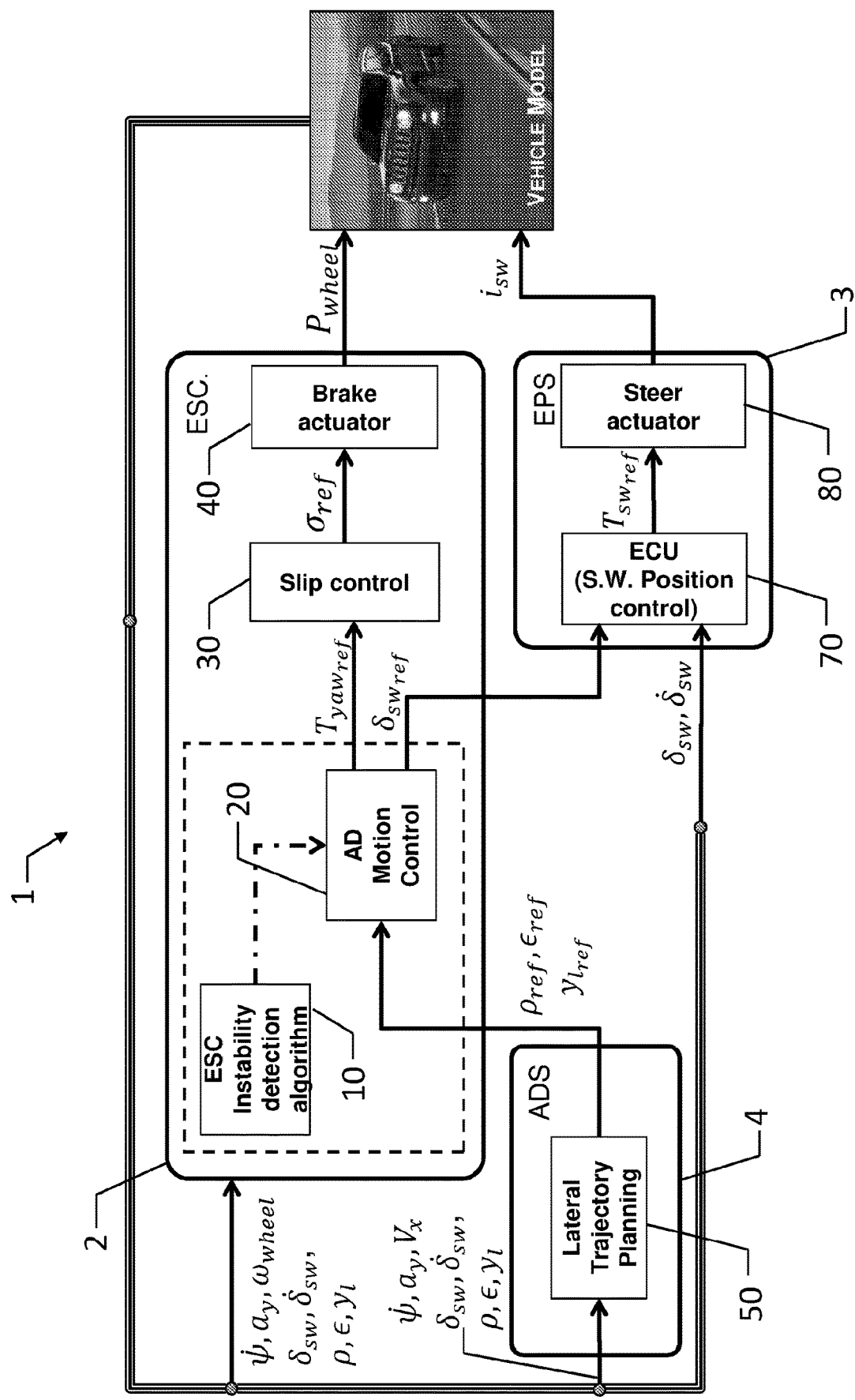
FIG. 3 shows a block diagram of a high-level architecture of an automotive advanced electronic system for controlling driving stability of an autonomous self-driving motor vehicle according to a second embodiment of the present invention.
Figure 4:
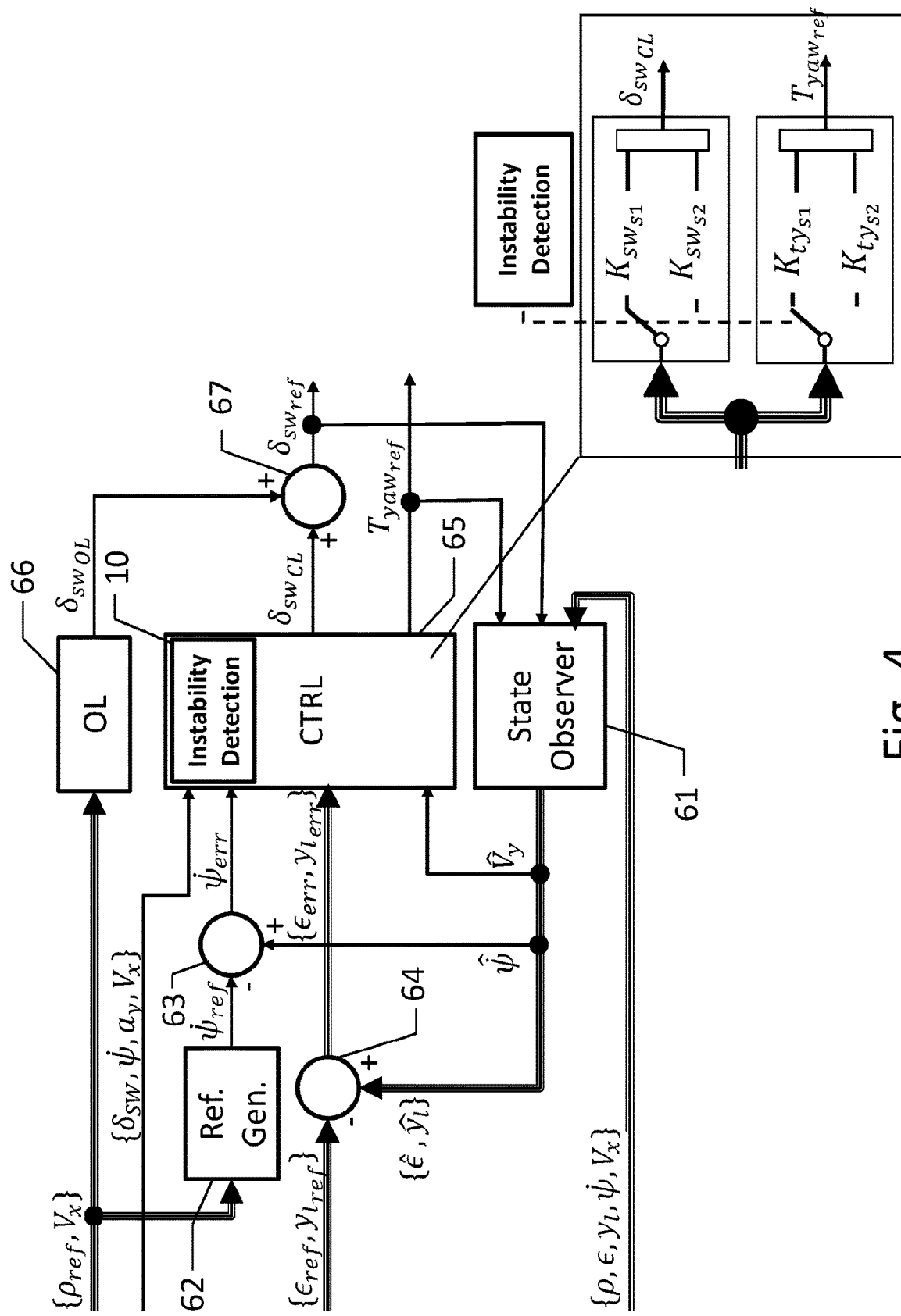
FIG. 4 shows a detailed block diagram of the automotive advanced automotive electronic control system shown in FIG. 3.

In a second, more advanced embodiment of the invention, shown in FIGS. 3 and 4, the interventions of the ESC and EPS systems are coordinated by changing the logical architectures of both the ESC and EPS systems, thus representing a re-thinking of the logical architectures thereof.

With reference to the first embodiment of the invention, FIG. 1 shows a block diagram of an integrated automotive electronic control system for controlling the lateral dynamics of an autonomous motor vehicle, referenced as a whole with reference numeral 1. In particular, FIG. 1 shows from an architectural point of view the domains of the ESC system, referenced with reference numeral 2, of the EPS system, references with reference numeral 3, and of the Autonomous Driving System, hereinafter referred to as ADS for the sake of brevity and referenced with reference number 4, which is designed to compute a reference steering angle $\delta_{sw_{ref}}$ for the EPS 3 system.

As shown in FIG. 1, the ESC system 2 receives a series of automotive quantities measured through an automotive sensory system or otherwise computed based on measured quantities and hereinafter both referred to as measured automotive quantities for the sake of convenience. The measured automotive quantities comprise, among others, the yaw rate $\dot{\psi}$, the lateral acceleration $\alpha_y$, the angular wheel speed $\omega_{wheel}$, the steering angle $\delta_{sw}$, and the steering speed $\dot{\delta}_{sw}$. Based on the received measured automotive quantities, the ESC system 2 is designed to compute a braking command for the automotive braking system in the form of a brake pressure $P_{wheel}$ to be applied to the brake calipers to cause a corresponding yaw torque $T_{yaw_{ref}}$ to be applied to the autonomous motor vehicle.

The ADS system 4 receives the measured automotive quantities $\dot{\psi}$, $\alpha_y$, $V_x$, $\delta_{sw}$, $\rho$, $\in$, $y_l$, where $\in$ is the heading of the motor vehicle relative to the longitudinal axis of the motor vehicle, $\rho$ is the road curvature ahead of the motor vehicle, $y_l$ is the lateral position of the motor vehicle relative to a planned driving path of the motor vehicle, wherein the latter three measured automotive quantities jointly define the position of the motor vehicle in a reference system of the motor vehicle, and $V_x$ is the longitudinal speed of the motor vehicle computed based on $\omega_{wheel}$.

Based on the received measured automotive quantities, the ADAS system 4 computes a steering angle $\delta_{sw_{ref}}$ for the EPS system 3 to cause the autonomous motor vehicle to follow the planned lateral driving path.

The EPS system 3 receives the computed reference steering angle $\delta_{sw_{ref}}$, the measured steering angle, $\delta_{sw}$ and the measured steering speed $\dot{\delta}_{sw}$, and based on these automotive quantities the EPS system 3 computes a steering command for the automotive steering system in the form of an electric current $i_{sw}$ to be supplied to an electric actuator of the automotive steering system so as to cause a steering torque to be applied to the steering column of the autonomous motor vehicle and, resultingly, the latter to achieve a corresponding steering angle $\delta_{sw_{ref}}$ so as to result in the autonomous motor vehicle following the planned lateral driving path.

In particular, the ESC system 2 is designed to:
- detect occurrence of an instability condition of the autonomous motor vehicle based on $\dot{\psi}$, $\alpha_y$, $\delta_{sw}$, $\dot{\delta}_{sw}$ (block 10),
- when occurrence of an instability condition of the autonomous motor vehicle is detected, compute a yaw torque $T_{yaw_{ref}}$ to be applied to the autonomous motor vehicle and that is to be followed, as described below (block 20),
- compute a longitudinal force that the wheels of the autonomous motor vehicle have to exert on the ground and associated target wheel spins $\sigma_{ref}$ (block 30), and
- compute and apply a brake pressure $P_{wheel}$ to the individual wheels in order to achieve the associated $\sigma_{ref}$ (block 40).

The ADS system 4 is designed to:
- compute, based on $\dot{\psi}$, $\alpha_y$, $V_x$, $\delta_{sw}$, $\rho$, $\in$, $y_l$, a planned lateral driving path to be followed by the autonomous motor vehicle and defined by a number of automotive quantities comprising a reference curvature $\rho_{ref}$, a reference heading $\in_{ref}$ and a reference lateral position $y_{l_{ref}}$ (block 50),
- compute the steering angle $\delta_{sw_{ref}}$ based on the automotive quantities which define the planned driving path of the autonomous motor vehicle (block 60).

In particular, in an autonomous motor vehicle, the planned lateral driving path is computed by a lateral driving path planner which is part of the autonomous driving system of the autonomous motor vehicle and which operates based on a proprietary lateral driving path planning algorithm which is specifically developed by the automotive manufacturer and which, therefore, is usually different for different automotive manufacturers.

The EPS system 3 is designed to:
- compute, based on the steering angle $\delta_{sw_{ref}}$, the steering torque $T_{sw_{ref}}$ to be applied to the steering column of the autonomous motor vehicle in order to achieve the steering angle $\delta_{sw_{ref}}$ (block 70).
- compute and supply the automotive steering system with a steering command in the form of an electric current $i_{sw}$ required to actuate the computed steering command.

FIG. 2 shows a detailed functional block diagram of the functional blocks of the first embodiment of the invention shown in FIG. 1 enclosed within the dashed area, and where the blocks are to be considered merely representative of the functions performed and not limited to a particular circuit architecture.

In particular, as described above, the ESC system 2 is designed to:
- receive $\dot{\psi}$, $\alpha_y$, $\omega_{wheel}$, $\delta_{sw}$, $\dot{\delta}_{sw}$,
- detect, based on the received automotive quantities, occurrence of an instability condition of the autonomous motor vehicle, and
- when occurrence of an instability condition of the autonomous motor vehicle is detected, compute $T_{yaw_{ref}}$ based on the received automotive quantities.

The steering angle $\delta_{sw_{ref}}$ computation block 60 comprises:
- a state observer 61, conveniently a time-variant one, configured to receive $\rho$, $\in$, $y_l$, $\dot{\psi}$, $V_x$ and $\delta_{sw_{ref}}$ or, alternatively, $\delta_{sw}$, and to output observed automotive quantities $\hat{\in}$, $\hat{y}_l$, $\dot{\hat{\psi}}$, $\hat{V}_y$, where $\hat{V}_y$ is the lateral speed of the autonomous motor vehicle, which are either computed by filtering corresponding measured automotive quantities or estimated based on other measured automotive quantities, so as to be also mutually phased, i.e. correlated and consistent with each other,
- a yaw rate reference generator 62 configured to receive $\rho_{ref}$, e $V_x$ and compute and output a reference yaw rate $\dot{\psi}_{ref}$ based on $\rho_{rep}$, e $V_x$ and on a model known in the literature, the simplest of which is represented by the product of $\rho_{ref}$ and $V_x$,
- a first subtractor 63 configured to receive and subtract $\dot{\psi}_{ref}$ and $\dot{\hat{\psi}}$, thus outputting a yaw rate error $\dot{\psi}_{err}$,
- a second subtractor 64 configured to receive and subtract $\in_{ref}$ e $\hat{\in}$ and $\beta_{l_{ref}e\hat{y}l}$, thus outputting associated heading and lateral position errors $\in_{err}$ e $y_{l_{err}}$ of the autonomous motor vehicle,
- a state feedback controller 65 configured to receive $\dot{\psi}_{err}$, $\in_{err}$, $y_{l_{err}}$, $\hat{V}_y$ and compute and output a closed-loop contribution $\delta_{sw_{CL}}$ to the steering angle $\delta_{sw_{ref}}$ based on $\dot{\psi}_{err}$, $\in_{err}$, $y_{l_{err}}$, $\hat{V}_y$ and on a state model known in the literature, the simplest of which is represented by an appropriate vector of gains $K_{SW_{sl}}$ to linearly combine $\dot{\psi}_{err}$, $\in_{err}$, $y_{l_{err}}$, $\hat{V}_y$;
- an open-loop controller 66 configured to receive $\rho_{ref}$ and $V_x$ and compute and output an open-loop or feed forward contribution $\delta_{sw_{OL}}$ to the steering angle $\delta_{sw_{ref}}$ based on $\rho_{ref}$ and $V_x$ and on one of the models known in the literature, in order to speed up the time response of the control logic and improve the compensation capability of $\rho$, and
- a summation unit 67 configured to receive and sum $\delta_{sw_{CL}}$ and $\delta_{sw_{OL}}$, thus outputting $\delta_{sw_{ref}}$.

With reference to the second embodiment of the invention, FIG. 3 shows from an architectural point of view the domains of the ESC system 2, the EPS system 3, and the ADS system 4.

A comparison between the architectures shown in FIGS. 1 and 3 shows that the second embodiment of the invention differs from the first embodiment shown in FIG. 1 in the yaw torque $T_{yaw_{ref}}$ and the steering angle $\delta_{sw_{ref}}$ being computed, instead of separately in the ESC system 2 and the ADS system 4, respectively, both in the ESC system 2 (block 70), which becomes the controller of both the braking system and the steering system of the autonomous motor vehicle.

In the second embodiment of the invention, in addition, the ESC system 2 receives $\dot{\psi}$, $a_y$, $\omega_{wheel}$, $\delta_{sw}$, $\dot{\delta}_{sw}$, $\rho$, $\in$, $y_l$, while the ADS system 4 receives $\dot{\psi}$, $a_y$, $V_x$, $\delta_{sw}$, $\dot{\delta}_{sw}$, $\rho$, $\in$, $y_l$.

Consequently, the logical architecture of the first embodiment of the invention shown in FIG. 2 transforms into that shown in FIG. 4, in which the state feedback controller 65 integrates the functionalities of the blocks 10 and 20.

As shown in FIG. 4, the state feedback controller 65 is designed to receive, in addition to $\dot{\psi}_{err}$, $\in_{err}$, $y_{l_{err}}$, $\hat{V}_y$, also $\delta_{sw}$, $\dot{\psi}$, $a_y$, $V_x$ to detect the occurrence of an instability condition of the autonomous motor vehicle and, when such a condition is detected, to compute the yaw torque $T_{yaw_{ref}}$, which is also inputted to the state observer 61 to allow it to compute $\hat{\in}$, $\hat{y}_l$, $\hat{\dot{\psi}}$, $\hat{V}_y$.

In this embodiment, the state feedback controller 65, which can conveniently be time-variant and, in order to be so, needs to receive $V_x$, is designed to compute and output:

$\delta_{sw_{CL}}$ based on a gain matrix selected between two different gain vectors $K_{sw_{s1}}$ and $K_{sw_{s2}}$ depending on whether or not occurrence of an instability condition of the autonomous motor vehicle is detected, and $T_{yaw_{ref}}$ based on a gain matrix selected between two different gain vectors $K_{ty_{s1}}$ and $K_{ty_{s2}}$ depending on whether or not occurrence of an instability condition of the autonomous motor vehicle is detected.

The invention claimed is:

1. An automotive electronic lateral dynamics control system of an autonomous motor vehicle, comprising:
    a lateral driving path planner designed to plan a lateral driving path of the autonomous motor vehicle and defined by a reference curvature ($\rho_{ref}$), a reference heading ($\in_{ref}$), and a reference lateral position ($y_{l_{ref}}$) of the autonomous motor vehicle;
    an automotive electronic driving stability control system designed to control an automotive braking system to apply to the autonomous motor vehicle a yaw torque ($T_{yaw_{ref}}$) to hinder a driving instability condition of the autonomous motor vehicle; and
    an automotive electronic steering control system designed to control an automotive steering system to apply to the autonomous motor vehicle a steering angle or torque ($\delta_{sw_{ref}}$, $T_{sw_{ref}}$) to cause the autonomous motor vehicle to follow the lateral driving path planned by the lateral driving path planner;
    wherein the automotive electronic lateral dynamics control system is designed to cause an intervention of the automotive electronic steering control system to take account of an intervention of the automotive electronic driving stability control system by:
    the planned lateral driving path of the autonomous motor vehicle being computed based on automotive quantities either measured or computed and indicative of:
    a current lateral driving path of the autonomous motor vehicle and defined by a road curvature ($\rho$) and heading ($\in$) and lateral position ($y_l$) of the autonomous motor vehicle, and
    a current dynamic state of the autonomous motor vehicle and defined by a yaw rate ($\dot{\psi}$), a lateral acceleration ($a_y$), a longitudinal speed ($V_x$), and a steering angle ($\delta_{sw}$); and
    the steering angle or torque ($\delta_{sw_{ref}}$, $T_{sw_{ref}}$) to be applied by the automotive steering system to the autonomous motor vehicle to cause it to follow the planned lateral driving path being computed based on the automotive quantities that define the planned lateral driving path of the autonomous motor vehicle and on a reference yaw rate ($\dot{\psi}_{ref}$), computed based on the reference curvature ($\rho_{ref}$) of the planned lateral driving path and on a longitudinal speed ($V_x$) of the autonomous motor vehicle.

2. The automotive electronic lateral dynamics control system of claim 1, further designed to compute:
    by means of a state observer, observed automotive quantities comprising an observed heading CO, an observed lateral position ($\hat{y}_l$), an observed yaw rate ($\hat{\dot{\psi}}$), and an observed lateral speed ($\hat{V}_y$) of the autonomous motor vehicle; the observed automotive quantities are either computed by filtering, or estimated based on, the measured heading ($\in$), the road curvature ($\rho$) ahead of the autonomous motor vehicle, and the lateral position ($y_l$) of the autonomous motor vehicle, which define the current driving path of the autonomous motor vehicle, the yaw rate ($\dot{\psi}$), the longitudinal speed ($V_x$) of the autonomous motor vehicle, and the steering angle or torque ($\delta_{sw_{ref}}$, $T_{sw_{ref}}$) to be applied by the automotive steering system to the autonomous motor vehicle to cause it to follow the planned lateral driving path;
    a yaw rate error ($\dot{\psi}_{err}$) based on the reference yaw rate ($\dot{\psi}_{ref}$) and on the observed yaw rate ($\hat{\dot{\psi}}$) of the autonomous motor vehicle;
    a heading error ($\in_{err}$) based on the reference heading ($\in_{ref}$) and the observed heading ($\hat{\in}$) of the autonomous motor vehicle;
    a lateral position error (($y_{l_{err}}$)) based on the reference lateral position (($y_{l_{ref}}$)) and the observed lateral position WO of the autonomous motor vehicle;
    by means of a state feedback controller, a closed-loop contribution ($\delta_{sw_{CL}}$) to the steering angle ($\delta_{sw_{ref}}$) based on the yaw rate error, heading error, and lateral position error ($\dot{\psi}_{err}$, $\in_{err}$, $y_{l_{err}}$) and on the observed lateral speed ($\hat{V}_y$) of the autonomous motor vehicle;
    by means of an open-loop state controller, an open-loop contribution ($\delta_{sw_{OL}}$) to the reference steering angle ($\delta_{sw_{ref}}$) based on the reference curvature ($\rho_{ref}$) of the planned lateral driving path and the longitudinal speed ($V_x$) of the autonomous motor vehicle; and
    the reference steering angle ($\delta_{sw_{ref}}$) based on the closed-loop and open-loop contributions ($\delta_{sw_{CL}}$, $\delta_{sw_{OL}}$) to the reference steering angle ($\Omega_{sw_{ref}}$).

3. The automotive electronic lateral dynamics control system of claim 2, wherein the state observer and/or the state feedback controller are time-variant.

4. An autonomous motor vehicle comprising the automotive electronic lateral dynamics control system of claim 1.

5. A software loadable in one or more automotive electronic control units of an automotive electronic lateral dynamics control system of an autonomous motor vehicle, and designed to cause, when run, the automotive electronic lateral dynamics control system of the autonomous motor vehicle to become configured as claimed in claim 1.

6. The automotive electronic lateral dynamics control system of claim 1, further designed to cause the yaw torque ($T_{yaw_{ref}}$) to be computed by the automotive electronic driving stability control system, and the steering angle or torque ($\delta_{sw_{ref}}$, $T_{sw_{ref}}$) to be computed in a different automotive system.

7. The automotive electronic lateral dynamics control system of claim 1, further designed to cause the steering angle or torque ($\delta_{sw_{ref}}$, $T_{sw_{ref}}$) and the yaw torque ($T_{yaw_{ref}}$) to be computed by the automotive electronic driving stability control system.

* * * * *